Figure 8:
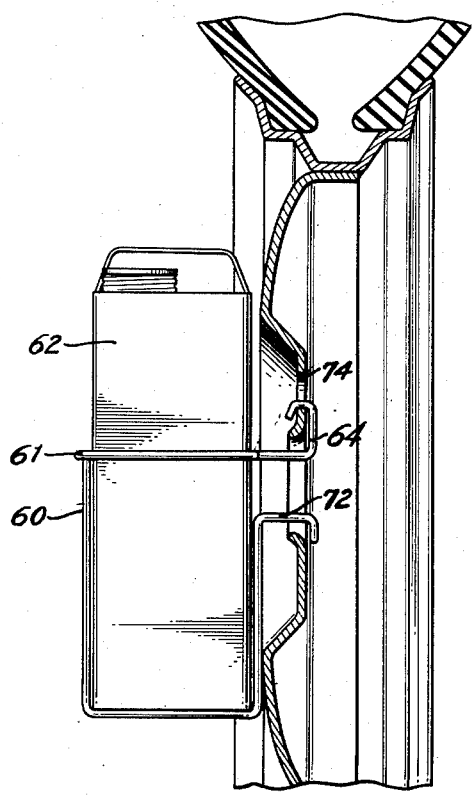

Sept. 6, 1960     F. L. O. ROEHRIG     2,951,671
CARRIER
Filed April 15, 1957     3 Sheets-Sheet 1
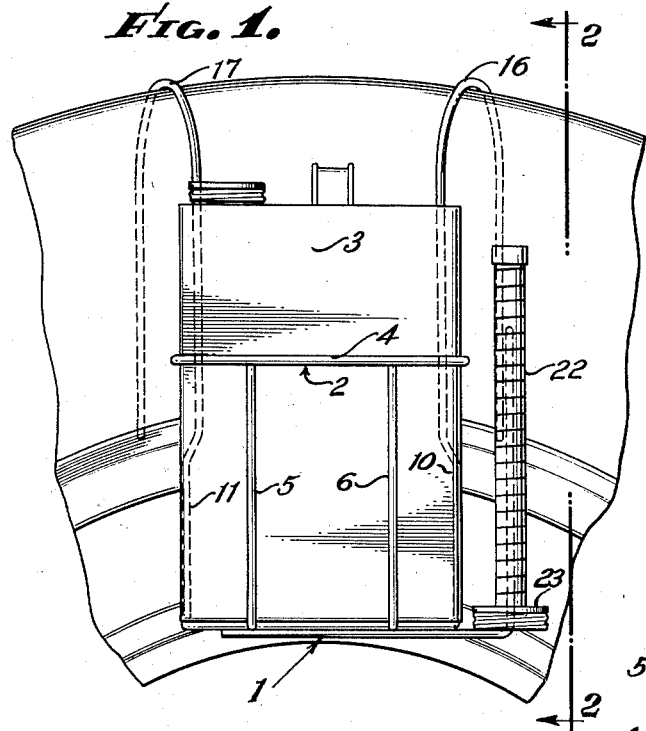
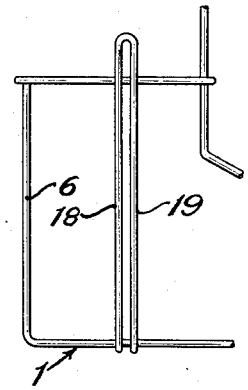
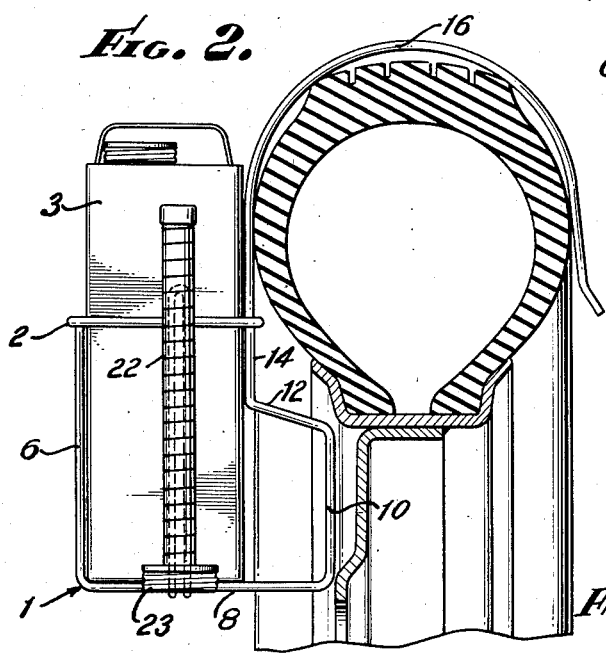
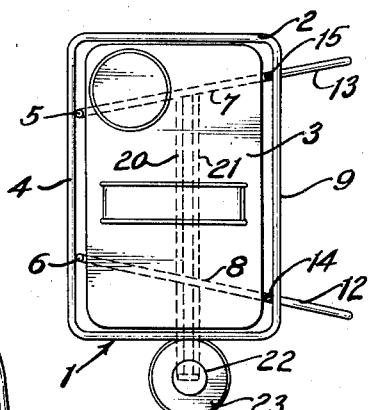
INVENTOR.
FREDERICK L. O. ROEHRIG
BY
                      ATTORNEY.

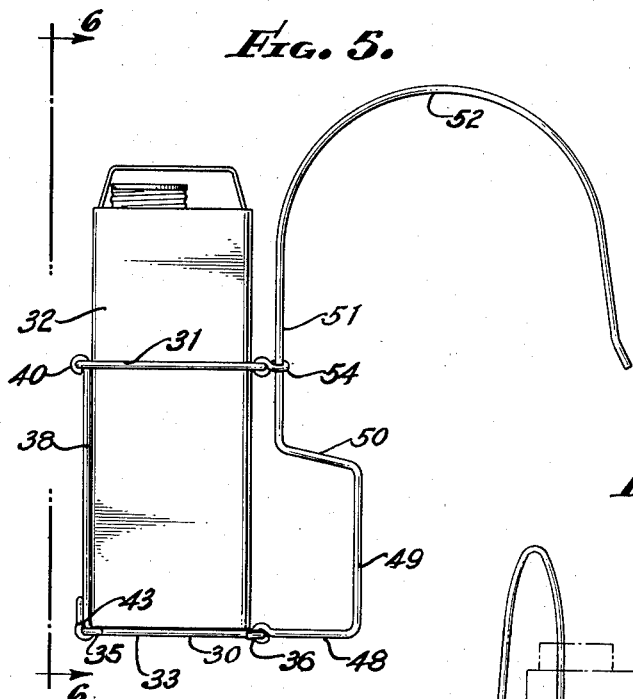
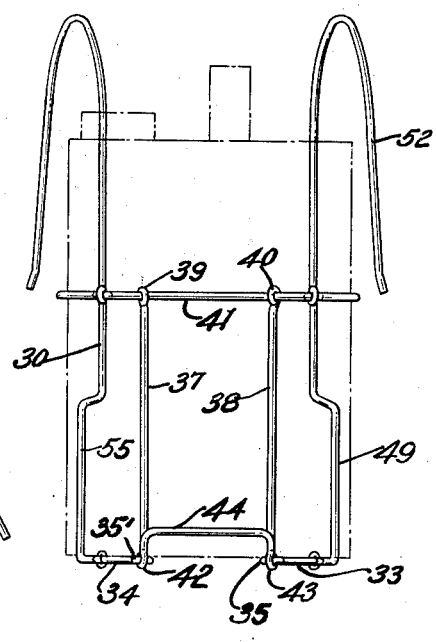
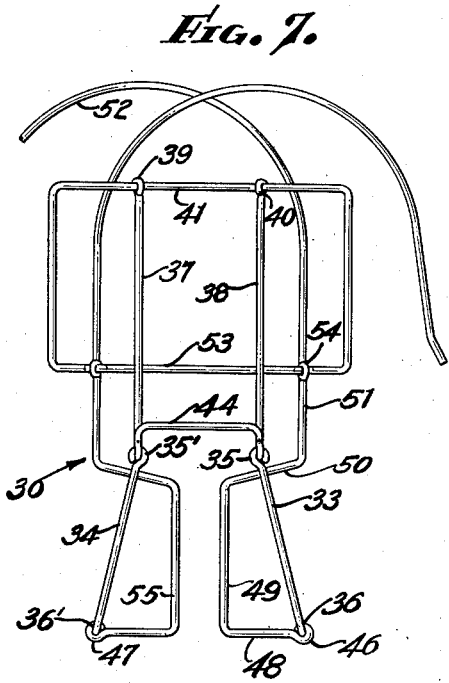

United States Patent Office 2,951,671
Patented Sept. 6, 1960

2,951,671
CARRIER

Frederick L. O. Roehrig, 6762 Valaria Drive,
Highland, Calif.

Filed Apr. 15, 1957, Ser. No. 652,884

1 Claim. (Cl. 248—311)

The present invention relates to carriers generally, and specifically to a type of carrier adapted to support cans which hold various fluids, such as, for instance, gasoline, oil, or water.

From the early days of automotive history, most vehicles were provided with running boards, and these running boards were sometimes used as a means of support for various cans holding liquids, whereby the automobile driver might replenish oil and gasoline to the motor and to the fuel tank, in case of necessity, on a long trip. With the discontinuance of running boards on passenger vehicles, cans, if used, are usually placed within the rear deck compartment without much regard as to the position to be assumed by the cans. This often resulted in leak of fluid from the cans with the possibility of an explosion, in the case of a volatile liquid or fluid, with a resultant fire hazard.

The present invention contemplates a carrier device for a can, which will be held in a desired position in the vehicle, and preferably within the rear compartment, with assurance that the can will not tip or shift its position during normal road travel of the vehicle.

The invention has for an object the provision of a carrier which is easily attached or detached from some supporting object associated with the vehicle, which occupies small space, and in fact may be collapsed for shipment purposes or when not in use, which is simple of structure, foolproof in operation, inexpensive in cost of manufacture, and generally superior to carriers now known to the inventor.

With the above mentioned and other objects in view, the invention consists in the novel and useful provision, formation, construction, association, and relative arrangement of parts, members and features, all as shown in certain embodiments in the accompanying drawings, described generally, and more particularly pointed out in the claim.

Figure 9:
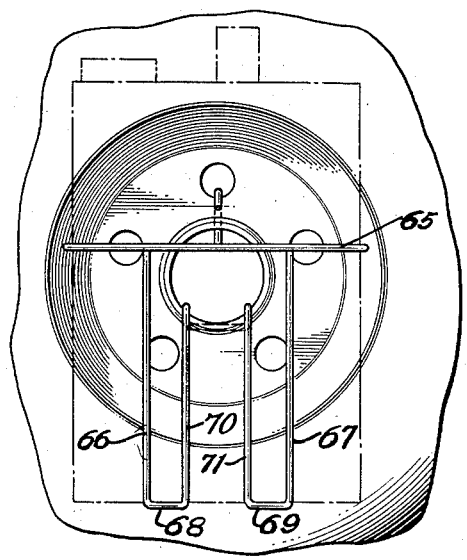
Figure 10:
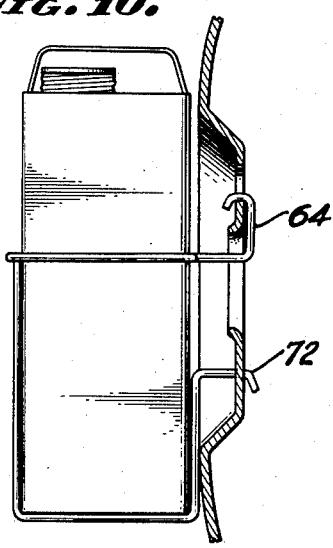
Figure 11:
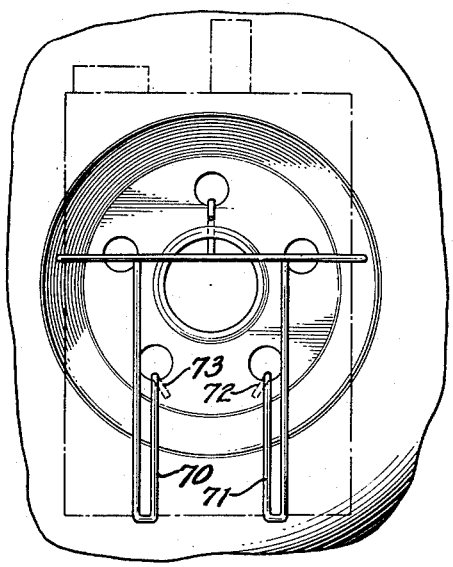

In the drawings:

Figure 1 is a rear elevation showing one form of carrier of the invention associated with a tire, such as a spare tire, the tire being shown in fragment, and said carrier holding a can, Figure 2 is a sectional view, partly in fragment, taken on the line 2—2 of Figure 1, Figure 3 is a top plan view of the carrier and can shown in Figure 1, Figure 4 is a fragmentary detail in side elevation of a portion of the carrier structure shown in Figures 1 to 3, inclusive, Figure 5 is a side elevation of a modified form of carrier supporting a can, Figure 6 is a view of the carrier shown in Figure 5, and looking in the direction of the arrows 6—6 of Figure 5, the can being shown by dotted lines, Figure 7 is a view of the carrier of Figures 5 and 6 shown in collapsed position, Figure 8 is a fragmentary, partially sectional view and in side elevation, of a further modified form of carrier, shown attached to a spare wheel, Figure 9 is a fragmentary front elevation of the carrier and wheel shown in Figure 8, Figure 10 is a further modification of the carrier shown attached to a wheel, the wheel disk being shown in section, and Figure 11 is a front elevation of the carrier and wheel disk shown in Figure 10.

Referring now with particularity to the drawings, and specifically to Figures 1 to 4, inclusive, the improved carrier is designated 1, and may be fabricated from bar or rod stock of fairly heavy gage such as, for instance, gage #8, in order that the carrier should be stable, when fabricated. However, regardless of the wire gage or bar gage, I provide a top member 2 of substantially rectangular form and which is adapted to spacedly encircle a can 3 of selected size and capacity, as shown in plan in Figure 3. Secured in any appropriate manner to the top framing 2, and particularly the front member 4 of said top framing are a pair of spaced upright or vertical rods 5 and 6. Integrally formed with the vertical rods are base rods 7 and 8 in right angular relationship to the vertical rods 5 and 6 and which base rods 7 and 8 diverge outwardly from the said connection with the vertical members 5 and 6, as best shown in Figure 3. Members 5 and 6 extend beyond the rear member 9 of the top framing 2, then the rods are bent upwardly at right angles to members 7 and 8, as shown at 10 and 11, then inwardly at 12 and 13 at an obtuse angle to the upright portions 10 and 11, followed by upright portions 14 and 15 which parallel the members 5 and 6, the rods then being bent outwardly in arcuate form, as shown at 16 and 17. The upright portions 14 and 15 are secured to a rear member 9 within the top framing 2, by welding or other means. To further stabilize the structure, I provide a bent loop of wire or rod (see Figure 4), to provide two parallel members 18 and 19 which are spaced outwardly from one side of the top member 2, which wires are bent at right angles to and extend between and beneath the portions 7 and 8 of the base rods, being secured thereto by welding or other means, as shown in Figure 3, in dotted lines at 20 and 21. Thus, the rods 7 and 8 function as a base for supporting the can 3 and the vertical rods, shown at 5, 6, 14 and 15, are adjacent sides of the said can.

Cans of the type shown in the drawing usually require a pouring spout, and I have provided a flexible pouring spout at 22, which is provided with a member 23 at one end, for engagement with the screw-threads of the neck of said can. The members 18 and 19 are adapted to support the pouring spout member 22 in upright position, as shown in Figure 1, the said members 18 and 19 entering the said flexible tube. In this manner, the pouring spout is at all times adjacent the can and is not likely to be lost. For supporting the said carrier and can, I have shown in Figures 1 and 2, an arrangement whereby the arcuate or curved members 16 and 17 are passed over the periphery of the spare tire which is usually carried in the trunk compartment of a vehicle. The portions 10 and 11 of the carrier engage the wheel for said spare tire, and thus the weight of the can and its contents are stably supported. It is obvious that the can would tend to rotate outwardly, but is restrained from so doing by the curved members 16 and 17 functioning as hooks, together with the members 10 and 11.

That form of the invention shown in Figures 5, 6 and 7 follows, in essential details, the construction of the carrier shown in Figures 1 to 4, inclusive, save and except that the carrier of Figures 1 to 4, inclusive, is of rigid nature, whereas the structure shown in Figures 5, 6 and 7 is capable of being collapsed so as to reduce occupied space and to allow ready shipment of carriers of the type shown. The collapsible carrier shown in Figures 5 to 7 inclusive, is designated as an entirety by the numeral 30. This carrier has substantially the same appearance as the carrier of Figures 1 to 4, inclusive, although in the present instance, the spout carrying member is not included in the structure. It is, however, quite obvious that such a spout carrying member may be incorporated in the structure. The rectangular top framing member 31 is adapted to encircle the work which, in this instance, is the can 32, at some zone intermediate the height of the said can, the can resting upon the base members 33 and 34 of the carrier when said members are moved to a horizontal position or from the position of Figure 7 to that of Figure 5. The base members include rods or wires each formed with end loops, such as shown for said base members at 35, 36, 35' and 36'. The front vertical members 37 and 38 are formed from a single length of rod or wire, the ends of which are looped, as shown at 39 and 40, the loops adapted to embrace the front member 41 of the rectangular frame member 31. The vertical members 37 and 38 are looped through the eyes 35 of the said vertical members, as shown in Figure 6, at 42 and 43, the said loops being joined by a transverse piece integral with the vertical members, as shown at 44. This transverse piece spaces the two vertical members 37 and 38 apart. The base members 33 and 34 have their looped ends 36 and 36' in engagement with loop ends 46 and 47 of a pair of rear members which support the carrier. These rear members are of identical construction, and one thereof will be described, the same description applying to the other member. The loop end 46 is on the end of a rod or wire having a horizontal portion 48, the vertical portion 49 of which is at right angles to the portion 48, the vertical portion being provided with a part 50 extending at an angle to the vertical portion 49, the portion 50, in turn, joining a vertical portion 51, which parallels portion 49, the vertical portion terminating in a curved hook 52. The vertical portion 51 is secured to the longitudinal framing member 53 by an S-link 54. As stated, a member generally designated as 55 is of identical construction to the rear member just described. Thus, in one position, the rear members may be swung or moved relative to each other so as to substantially overlie and permit ready shipment of the carrier. The members may be swung from the position shown in Figure 7 to that of Figures 5 and 6, the top framing member 41 being moved to the position shown in said figures, that is, to a horizontal position so as to encircle the can 32, with the base member swung to a horizontal position, as shown in Figure 5. The curved hooks, such as 52, may embrace some supporting member, such as a pneumatic tire, in the manner shown in Figures 1 and 2.

The form of the invention shown in Figures 8 and 9 includes a carrier designated generally as 60, having a substantially rectangular wire or rod type framing 61, adapted to encircle the can 62, the rear longitudinal side 63 of said rectangular framing being provided intermediate its length with a hook extension 64. The front horizontal member 65 of said framing has secured thereto two spaced apart, vertical members 66 and 67. Forming an integral part of the vertical members are a pair of base members 68 and 69 in substantially right angular relationship to the vertical members, with said base members being at an angle to each other, as shown in Figures 9 and 11, followed by a pair of rear vertical members 70 and 71 at right angles to the base members 68 and 69, and substantially parallel to the vertical members 66 and 67, the rear vertical members terminating in extended hook members 72 and 73. It is intended that the particular form of construction shown in Figures 8 to 11, inclusive, should have the hook members 64 passed through the hub portion of the disk wheel 74, while hook members 72 and 73 are passed through the center bore of the hub portion of the disk, as shown in Figures 8 and 9, to thereby hold the carrier to the wheel disk. If desired, however, the hook members 72 and 73 may be spaced apart, the vertical members 70 and 71 being reduced in length, so that said hook members 72 and 73 may be received in certain of the bolt openings of the disk of the wheel, as shown in Figures 10 and 11. This constitutes the only difference in structure between the carrier of the form shown in Figures 8 and 9 from that shown in Figures 10 and 11.

I claim:

A carrier for a can, including: a rod type rectangular frame adapted to transversely encircle the can between the base and top thereof, rods pendent from and in right angular relation to said rectangular frame, said rods each being bent at substantially a right angle to provide base support rods for the can and said base support rods each being bent at substantially a right angle to provide rods oppositely positioned to and paralleling the rods pendent from the rectangular frame, the last named rods being formed with hook support members, a pair of closely adjacent and parallel rods secured transversely of the base support rods and extending outwardly beyond the confines of the rectangular frame which transversely encircles the can, the last named pair of rods likewise being bent at right angles to provide a portion for receiving a spout for said can, to be carried by the carrier.

References Cited in the file of this patent

UNITED STATES PATENTS

| 167,620 | Richards | Sept. 14, 1875 |
| 300,704 | Frost | June 17, 1884 |
| 475,787 | Meyer | May 31, 1892 |
| 1,463,962 | McClintock | Aug. 7, 1923 |
| 1,936,517 | Maine | Nov. 21, 1933 |
| 2,010,440 | Ryan | Aug. 6, 1935 |
| 2,206,775 | Hoofer | July 2, 1940 |
| 2,221,659 | Wilkie | Nov. 12, 1940 |
| 2,420,603 | Lee | May 13, 1947 |
| 2,663,249 | Reed | Mar. 31, 1953 |